United States Patent [19]
Gray et al.

[11] Patent Number: 6,060,292
[45] Date of Patent: May 9, 2000

[54] COMPOST DECONTAMINATION OF SOIL CONTAMINATED WITH METHOXYCHLOR

[75] Inventors: Neil C. C. Gray, Oakville; Guy P. Moser; Lori E. Moser, both of Guelph, all of Canada

[73] Assignee: Zeneca, Inc., Wilmington, Del.

[21] Appl. No.: 09/267,480

[22] Filed: Mar. 11, 1999

Related U.S. Application Data

[63] Continuation-in-part of application No. 08/742,508, Nov. 1, 1996, Pat. No. 5,902,744.

[51] Int. Cl.⁷ ........................................................ C12P 1/04
[52] U.S. Cl. ...................... 435/170; 435/262.5; 588/207
[58] Field of Search ..................................... 435/170, 262, 435/262.5; 588/207

[56] References Cited

U.S. PATENT DOCUMENTS

| | | | |
|---|---|---|---|
| 4,511,657 | 4/1985 | Colaruotolo et al. | 435/253 |
| 5,466,600 | 11/1995 | Jablonski et al. | 435/262.5 |
| 5,593,888 | 1/1997 | Glaze et al. | 435/262.5 |
| 5,660,612 | 8/1997 | Bernier et al. | 71/15 |
| 5,700,685 | 12/1997 | Murphy | 435/262.5 |
| 5,824,541 | 10/1998 | Horn et al. | 435/262.5 |

OTHER PUBLICATIONS

"Principles of Complexity Guide; The Biocept of the Art in Science Compost; Journal of Waste Regularity; The T J Press Inc.; 1991 pp. 14–17." Anaerobic DDT Biogradtion. Environment of Afflection of Substrates and Lom Oxidation Parental "Applied Experiment Monotsoylige Dec. 1931; Yon et al pp. 1–35; Ansolin DDT Pesicides of Contaminated Soil Mixed Consort and Enhancement for Surfacant in Starry Isebeto".

Yon et al. Water Environment Federation, Oct. 1994 pp. 635–645.

*Primary Examiner*—David A. Redding
*Attorney, Agent, or Firm*—Robert J. Reichert

[57] ABSTRACT

The present invention provides a process of decontaminating soil and/or sendiment containing methoxychlor by converting this contaminant into harmless materials thereby decontaminating the soil to whatever extent desired, either partial decontamination or complete remediation. The process comprises treating soil and or sediment which contains populations of viable anaerobic and aerobic microbes capable of transforming methoxychlor into harmless materials and being viable under both anaerobic and aerobic conditions.

13 Claims, No Drawings

COMPOST DECONTAMINATION OF SOIL CONTAMINATED WITH METHOXYCHLOR

This application is a Continuation-in-part of application Ser. No. 08/742,508 filed Nov. 1, 1996, now U.S. Pat. No. 5,902,744.

BACKGROUND OF THE INVENTION

This invention relates to a controlled composting process for decontaminating soil and/or sediments containing methoxychlor.

Numerous land sites exist that are contaminated with the chlorinated contaminants. Most of these contaminants are toxic pesticides and many are believed to be carcinogens. Various methods have been used to decrease the contamination of the soil including incineration, low temperature thermal description and chemical treatments. All of these methods are extremely expensive and may not be suitable for many contaminated sites.

SUMMARY OF THE INVENTION

The present invention provides a process of decontaminating soil and/or sediments containing methoxychlor into harmless materials, thereby decontaminating the soil to whatever extent desired, either partial decontamination or complete remediation. The process comprises treating soil and/or sediment which contains populations of viable anaerobic and being viable under both anaerobic and aerobic conditions. The treatment comprises admixing the contaminated soil with amendment material to form a compost mixture containing organic nutrient materials; composting this mixture while maintaining its temperature in the range of about 20° C. to 65° C. and its water content in the range of about 40% to 100% WHC; during this composting maintaining the redox potential of the compost mixture below about negative 200 mV until a significant amount of the chlorinated contaminant is degraded; and thereafter oxygenating the compost mixture to raise the redox potential level of the compost mixture to above about positive 100 mV, and maintaining the redox potential level above about positive 100 mV until a significant amount of the chlorinated contaminant is degraded.

The sequence of stages of negative/positive redox potential levels can be reversed and can be repeated as described to yield soil containing little or no undesirable methoxychlor, it having been converted to harmless products.

DESCRIPTION OF THE INVENTION

The term "composting" as used herein in describing the decontamination process of the present invention means transforming by degradation methoxychlor in the soil and/or sediment to harmless materials utilizing biological activity, the process being carried out, preferably in the solid state, with the addition of organic nutrient material.

"Harmless materials" are materials that are unobjectionable in the concentrations present in soil or sediment for its intended use.

"Decontamination" means transforming methoxychlor to harmless materials, including biodegrading said contaminants and binding said contaminants to soil or other material.

"Remediation" means decontamination to an unobjectionable level of methoxychlor in the soil for the intended use of the soil.

"Soil" means earth, i.e. humus, sand and particulate rock, and includes sediment from beneath the surface of water.

In the process of the present invention, during composting the soil to be decontaminated must contain appropriate types of indigenous viable microbes capable of degrading chlorinated contaminants. These microbes must be viable under both the anaerobic and aerobic conditions to which they will be subjected during the present process. The microbes normally are bacteria, fungi, actinomycetes and to a lesser extent protozoa. The microbes preferably are indigenous to the contaminated soil, that is, they are present in the soil to be decontaminated; or they are recycled from, or along with, soil already subjected to the present process. In some cases it may be beneficial to add an inoculant containing such viable degrading microbes.

In the practice of the present invention a solid compost mixture is prepared by mixing appropriate soil amendment mixture into the soil to be decontaminated, in an amount of at least about 10%, and up to 95% by weight of the mixture, and preferably from about 30% to 70% by weight amendment. The soil amendment material comprises a conventional source of organic nutrients for composting. The preferred amendment nutrient materials are agricultural waste and municipal waste sludge, preferably a manure such as horse, cow, sheep, turkey, chicken or fish manure, or activated sludge. Alfalfa, hay, sawdust, straw, peat, grass and other bulking materials preferably also are included in the amendment material, and may originate in manure or be specifically added. In some cases it may be desirable to add into the soil amendment a surfactant, preferably a formulated anionic and nonionic surfactant mixture, to render the contaminants more available to biological degradation. Suitable surfactants include polysorbates, octoxynols, anionic alkyl sulfates, anionic alkyl aryl sulfonates and ethoxylates. Examples of suitable surfactants include "Tween" nonionic surfactants which are commercially available from ICI Americas, Inc., "Triton" nonionic surfactants which are commercially available from Union Carbide and "DAWN" detergent nonionic surfactant mixture which is commercially available from Proctor & Gamble. A suitable mixture of surfactants is "Triton" X-100 and "DAWN". The amendment material may also contain, or be supplemented with, liquid or solid organic or inorganic nutrients. Organic materials high in nitrates and phosphates are normally used.

The compost mixture is maintained moist, but preferably in a solid state. Throughout the process the moisture level is maintained at less than 100% of the mixture's water holding capacity (WHC), preferably in the range of about 40% to 100% WHC.

After mixing, biological degradation of organic matter in the mixture starts, raising the temperature and depleting the oxygen to an anaerobic condition. The temperature of the mixture is thereafter maintained within the range of about 20° C. to 65° C. This is easily done by controlled gas movement through the compost mixture (e.g. through pipes) and/or by the addition of nutrient material. Below about 20° C., the biodegradation proceeds uneconomically slowly; above about 65° C. excessive bacteria kill may take place. The preferred temperature range is within about 30° C. to 55° C. The aerobic microbes in the compost mixture remain viable for the subsequent aerobic degradation step and the anaerobic bacteria remain viable for any needed subsequent anaerobic degradation steps. Thus, it is essential that viable aerobic and anaerobic degradation microbes be maintained during the process of the present invention.

During the anaerobic step a low redox potential level is maintained in the compost mixture, below about negative 200 mV, and preferably within the range of about negative 300 mV to 500 mV. This level has been found to be optimum for the anaerobic degradation of methoxychlor in the present composting process. The redox potential level can be maintained within this range by moist air movement through the compost and/or by the addition of conventional reducing agents such as sulphite and acetate compounds.

The first anaerobic step and any subsequent anaerobic steps are continued until a significant amount of methoxychlor is degraded. This can be determined by analysis. Typically, in the first anaerobic step degradation of about 20% to 50% of the initial content of methoxychlor is desirable.

After the methoxychlor content of the soil/amendment mixture is decreased significantly in a first anaerobic step, the mixture is oxygenated by any suitable means, preferably by air fed through and/or mixed with the mixture to achieve aerobic conditions. There must be sufficient oxygenation for the redox potential level during the aerobic step to be maintained above about positive 100 mV. The aerobic conditions bring about further degradation yielding harmless materials. The aerobic degradation step is continued until a significant amount of methoxychlor is degraded.

In most cases, the desired degree of biodegradation of chlorinated contaminants for acceptable remediation will not be achieved in the first anaerobic/aerobic treatment sequence. In the highly preferred process, the sequence is therefore repeated one or more times as needed for acceptable soil remediation. Substantially complete decontamination from chlorinated contaminants is readily achievable by this multi-step sequence preferred process.

Not intending to be bound by the following theory, it is believed that during anaerobic degradation the anaerobic microbes remove at least one or two chlorine's from the methoxychlor. Further aerobic degradation reduces these to less toxic metabolites. Since significant quantities of the methoxychlor and toxic metabolites may also be bound to soil and/or organic materials producing harmless materials, the term "degradation" as used herein includes not only biodegradation but also such binding of contaminants.

A desirable feature of this process is that the degrading microbes are maintained viable throughout the anaerobic/aerobic treatment cycles, so that it is not essential that microbes be supplemented before repeating the treatment cycle. However, it may be desirable to add more nutrient materials, manure, or other conventional fermentation ingredients, primarily to supplement the organic feed supply and to also introduce more bulking agent.

As aforementioned, maintaining the proper redox potential levels of the compost mixture in the anaerobic and aerobic steps is necessary for efficient practice of the present invention. The appropriate redox potential levels can be maintained by the addition of conventional nutrient materials and/or reducing agents such as sulphite and/or acetate compounds. Absolute anaerobic and aerobic conditions are needed (although short localized excursions can be expected). For the purpose of defining the present invention, a redox potential level of less than about negative 200 mV is considered anaerobic, and is required for the anaerobic steps; and a redox potential level greater than about positive 100 mV, is considered aerobic and is required for the aerobic steps. During the anaerobic steps, the preferred redox potential level is in the range of about negative 300 to 500 mV; and during the aerobic steps it is in the range of about positive 200 to 300 mV. The redox potential level from about negative 200 mV to about positive 100 mV is considered anoxic. In the present process, when going from anaerobic to aerobic conditions, and vice versa, anoxic conditions are present in the compost. During this period, degradation of some chlorinated contaminants appears to take place, but at low rates. Thus, speedy transition from one state to the other expedites overall degradation.

In the practice of the present invention, it may be desirable to have anaerobic conditions in some parts of the compost and at the same time aerobic conditions in other parts. This may be desirable because of different initial contaminant levels and/or degradation rates in different parts of the compost mixture. Thus, to approach uniform degradation, it may be desirable that some parts of the compost remain longer in an anaerobic or an aerobic state.

During composing high microbe counts are present, preferably up to $10^8$ aerobic culture forming units per gram, as measured by standard plate count techniques (cfu), and up to $10^6$ anaerobic cfu/g. These microbe counts of course include microbes other than those that degrade chlorinated contaminants.

In practice the present process is conducted in a compost pile, normally in a container cell or windrow. The soil to be treated can be analyzed and composted in the laboratory to determine optimum composting conditions, amendment composition, and anaerobic/aerobic treatment times and number of sequences. Typically for soil contaminated with up to 600 ppm of methoxychlor, 3 sequences of 2 weeks anaerobic composting followed by 2 weeks of aerobic composting will decontaminate one ton batches of soil down to contaminant levels of less than 140 ppm chlorinated contaminants.

As above described, the present process involves an anaerobic composting stage followed by an aerobic stage. This sequence appears necessary to degrade toxic chlorinated contaminant metabolites. However, it may be desirable to initially treat the soil aerobically.

The following Examples are illustrative of the practice of the present invention:

EXAMPLE 1

In this study, a 150 g. sample of soil contaminated with 50–100 ppm of methoxychlor (Test Nos. 14) is mixed with 40% v/v horse manure and 5% straw v/v, the mixture containing water at about 80% WHC. The methoxychlor sample is then flushed with an aerobic mixture of 5% hydroben, 5% carbon dioxide and 90% nitrogen and then put into an air tight anaerobic chamber, close capped tightly and incubated at 36 degrees C. for four weeks. The soil is mixed weekly. During this anaerobic treatment the redox potential decreases rapidly and remains below negative 200 mV through the anaerobic treatment.

The sample is then uncapped, mixed thoroughly weekly to aerate with atmospheric air at 80% relative humidity at 35–40 degrees C. for 4 weeks. The moisture level is maintained at 60–70% WHC by twice weekly manual addition of water and mixing. During this aerobic treatment the redox potential rapidly rises quickly and remains above positive 100 mV throughout the aerobic treatment.

After two cycles of this treatment the methoxychlor content of the sample is found to have decreased significantly.

EXAMPLE 2

Soil contaminated with methoxchlor is mixed with 40% v/v manure and 5% v/v straw too make a total of 175 g, the mixture containing water at about 50% WHC. This sample is then treated by flushing thoroughly with an anaerobic mixture of 5% hydrogen, a 5% carbon dioxide and 90% nitrogen and then put into an anaerobic chamber and incubated at 45 degrees C. for 4 weeks. The soil is mixed weekly. During this anaerobic treatment the redox potential decreases rapidly and remains below negative 200 mV throughout the anaerobic treatment.

The sample is then uncapped and mixed thoroughly weekly to aerate with atmospheric air at 80% relative humidity at 34 degrees C. for 4 weeks. The moisture level is maintained at 60–70% WHC by twice weekly manual addition of water and mixing. During this aerobic treatment the redox potential rapidly rises and remains above positive 100 mV throughout the aerobic treatment.

After two cycles of this treatment it is found that 99% of the methoxychlor is removed.

What is claimed:

1. The process of decontaminating soil containing methoxychlor by transforming said methoxychlor contaminant into harmless material which soil contains a population of viable anaerobic and aerobic microbes capable of transforming methoxychlor into harmless material and being viable under both anaerobic and aerobic conditions comprising:

(a) admixing said soil with amendment material to form a solid compost mixture containing organic nutrient materials;

(b) composting said soil while maintaining the temperature of the compost mixture in the range of about 20° C. to 65° C. and the water content of the compost mixture in the range of about 40% to 100% WHC;

(c) during said composting maintaining the redox potential level of the compost mixture below about negative 200 mV until a significant amount of said contaminant is degraded; and (d) thereafter oxygenating the compost mixture to raise the redox potential level of the compost mixture to above about positive 100 mV, and maintaining the redox potential level above about positive 100 until a significant amount of contaminant is degraded.

2. The process of claim 1 wherein the sequence of steps (a) to (d) are repeated.

3. The process of claim 1 wherein the sequence of steps (b) through (d) are repeated.

4. The process of claim 1 wherein said compost mixture initially contains at least about 10% by weight of amendment material.

5. The process of claim 1 wherein the amendment material comprises agricultural waste or municipal waste sludge.

6. The process of claim 1 wherein said amendment material comprises a bulking material.

7. The process of claim 1 wherein said amendment material comprises a nutrient material selected from the group consisting of horse, cow, sheep, fish, turkey, and chicken manures and activated sludge.

8. The process of claim 1 wherein said amendment material comprises a bulking material selected from the group consisting of straw, peat, alfalfa, hay, sawdust and grass.

9. The process of claim 1 wherein said compost mixture initially contains in the range of 30–70% by weight of said amendment material.

10. The process of claim 1 wherein a surfactant is added to said compost mixture.

11. The process of claim 1 wherein a surfactant from the group consisting of non-ionic surfactants and anionic surfactants is added to said compost mixture.

12. The process of claim 1 wherein said temperature is in the range of about 30° C. to 55° C.

13. The process of claim 1 wherein when said redox potential level is below negative 200 mV it is maintained in the range of about negative 300 mV to 500 mV, and when said redox potential level is above about positive 100 mV it is maintained in the range of about positive 200 to 300 mV.

* * * * *